Patented Apr. 28, 1931

1,802,662

UNITED STATES PATENT OFFICE

RALPH H. McKEE, OF JERSEY CITY, NEW JERSEY

METHOD OF ADMINISTERING CHLORINE GAS FOR THE TREATMENT OF COLDS AND THE LIKE

No Drawing. Original application filed June 15, 1925, Serial No. 37,324. Divided and this application filed April 2, 1928. Serial No. 266,873.

This invention relates to a method of treating respiratory diseases, and more particularly to an improvement in the method of handling chlorine for use in the treatment of colds and other germ infectious diseases.

This is a division of my copending application Serial Number 37,324, filed June 15th, 1925.

Since the adoption of chlorine by the medical profession for the treatment of colds and other germ infectious diseases, several methods have been suggested for liberating a desired amount of chlorine in the room. The desired treatment has been about one-half gram of chlorine gas for each 1,000 cubic feet of space. One of the ways to accomplish this is to set free approximately 300 cc. (1 gram) of chlorine in a room of 1,000 cubic feet. This gives double the desired concentration the first part of the hour but about right later in the hour's treatment. The methods of accomplishing this treatment have been subject to considerable difficulty and great lack of convenience. One method is to break a globe of chlorine gas containing approximately 300 cc. in a small room. However, the size of the globe which must be used causes trouble due to the fact that it is large, awkward and dangerous to use because of broken glass. It is further objectionable from the merchant's standpoint because of its fragile character and is thus likely to become broken in transit or on the shelves of the store. When broken in the store it not only entails loss but is objectionable due to the odor of chlorine gas set free and due to the effect of the chlorine gas set free on other articles of merchandise. It has also been proposed to employ a small electrolytic battery operating on a hydrochloric acid solution and to have the patient employ a mask or muzzle through which the gas liberated is breathed for a period of approximately an hour. Another method that has been proposed is to liberate chlorine gas from a cylinder or container in which a quantity of liquid chlorine is placed, and thus permit the gas to be injected into the room where the patient is when the container is opened. Still other methods have been proposed but all are open to the serious objection that it is difficult to properly regulate the amount of chlorine liberated; for example, the concentration of the chlorine in the room changes during the hour's treament of the patient.

In addition to the methods outlined above it has also been proposed to employ liquefied chlorine in an ampule, but the use of chlorine in liquid form or of chlorine dissolved in a solvent whose boiling point is below normal room temperature necessitates the use of an ampule which would be subject to high pressure at all times, and when the ampule is opened there would be danger of flying glass and other difficulties due to the necessity of high pressure in the ampule to keep the chlorine or solvent or both in liquid form. Moreover, such a method does not bring about a constant adjustment of the concentration of chlorine in the room where the patient is receiving the treatment.

In the present invention I provide a method of releasing a given quantity of chlorine gas in a volatile liquid, which liquid does not destroy or use up the chlorine in appreciable amounts. This chlorine solution or liquid is placed in a small container such as a glass ampule which is adapted to be broken when it is to be used and the contents thereof poured into a saucer or glass from which the chlorine and the volatile liquid are liberated. Various solvents may be employed for this purpose such as water, carbon tetrachloride, chloroform, methylene chloride and similar solvents. By dissolving the chlorine in a liquid in the manner set forth and placing the same in an ampule a product is obtained which will occupy only a small space on the druggist's shelves and which is not likely to be broken in handling as merchandise.

A further advantage of the invention is due to the fact that it changes the chlorine process of treating respiratory diseases from a process which must be performed in the hospital or doctor's office to one which can be carried out in the home under the direction of the physician or even by the patient alone.

The method also permits the amount of chlorine liberated to be accurately regulated and removes the possibility of overtreatment as in some of the methods of treatment hitherto employed. Due to the fact that the evaporation of the chlorine from a solution of the character referred to is not instantaneous, but takes a moderate amount of time, the chlorine concentration will be maintained substantially uniform during the process of treating the patient. Heretofore, for example, when a 300 cc. globe of chlorine was broken and its contents (about 1 gram) discharged into a room of 1,000 cubic feet the concentration at the start would be .001 gram of chlorine per cubic foot, but due to the adsorption of the chlorine by walls, clothing, by the breathing of the patient and particularly by any moist objects present in a room this concentration would be decreased in half an hour ordinarily to but half the original concentration, and towards the last of the hour to still less concentration. This means that the patient instead of being subjected to a constant treatment with chlorine gas is subjected to a treatment with a concentration continually decreasing instead of remaining constant, when constant concentration is of course the ideal desired. With my method, on the contrary, a large amount of chlorine is given out in the first few minutes but the evaporation of the chlorine and of its solvent continues and, if the amounts are properly chosen, is not completed until approximately the end of the hour so that the concentration of chlorine gas to which the patient is subjected is at the optimum throughout the entire period.

While various solvents such as set forth above may be employed, I prefer to use methylene chloride or carbon tetrachloride because of the fact that they are more readily volatile than certain other solvents of chlorine such for example, as water. Both possess the further advantage that they are good solvents for chlorine gas, and each also is in itself a mild anæsthetic. The chlorine gas when applied in the previously known ways normally produces a slight irritation in the back of the throat and sometimes some slight irritation or smarting of the eyes. Due to the presence of the methylene chloride or carbon tethachloride there is a mild anæsthetic action which tends to remove the irritations mentioned and tends to quiet the nerves of the patient, which last effect is particularly desirable in the chlorine method of treatment of respiratory diseases because of the fact that the chlorine has a slight exciting effect on the nerves of the individual. The irritating and exciting effect of the chlorine gas is of no advantage in the medical treatment and is only an accidental feature thereof. Methylene chloride and carbon tetrachloride counteract to a certain extent this exciting and irritating effect of the chlorine gas.

The amount of such solvent employed to dissolve the desired amount of chlorine is small, and is too small to be objectionable from its physiological aspect as an anæsthetic but sufficient, however, to serve as a quieting influence and one decreasing the amount of irritation. If methylene chloride is saturated at 0° with chlorine, it requires only 2 cc. of the solvent to carry 1 gram of chloride. If carbon tetrachloride is used, about 3.5 cc. are needed to hold 1 gram of chlorine at 0° C. In preparing the chlorine solution chlorine gas is preferably run into cold methylene chloride or carbon tetrachloride until approximately one gram of chlorine is dissolved in 3 to 5 cc. of the solvent. This amount is then introduced into a small glass ampule and the ampule sealed preferably in a flame in the usual and well known manner. When the chlorine is to be used the ampule is opened by the patient and emptied into a small vessel such as an ordinary tumbler in a closed room of, for example, approximately 1,000 cubic feet capacity. In a few minutes about half the chlorine and a portion of its solvent will have evaporated into the room.

After the ampule has been opened and the chlorine gas permitted to escape from the volatile liquid into the room, the patient remains in the chlorinated atmosphere for a period of approximately an hour in the manner hitherto employed in the treatment of colds and the like. The concentration of the chlorine in the air of the room will be continually supplemented by the continuing evaporation of the chlorine from the solution and will remain approximately constant throughout the period of treatment. The treatment may be repeated at intervals if desired as prescribed by the physician. Ordinarily one treatment in the manner described or at most two treatments on each of two successive days effect the desired cure.

When solvents other than those specifically referred to above are employed the chlorine is dissolved in the same manner but in a different ratio as will be apparent, and the solution sealed in the ampule, and the ampule opened and used in the manner above described.

It will be apparent that this method simplifies the chlorine treament of colds to such an extent that it may readily be used in the home either under the direction of a physician or even by the individual patient.

While I have described in detail the preferred practice of my process, it is to be understood that the details of procedure may be widely varied without departing from the spirit of the invention or the scope of the subjoined claims.

I claim:

1. In a method of administering chlorine gas for the treatment of colds and the like the improvement which comprises exposing to the atmosphere of a closed room wherein a patient is being treated a solution of chlorine in a chlorinated methane, the ratio of chlorine to the chlorinated methane being such as to give on evaporation an approximately constant concentration of chlorine gas during the period of treatment, the amount of chlorine present in said solution being sufficient to be effective in treating colds and the like but insufficient to be harmful to the patient, and the amount of chlorinated methane present being sufficient to have a quieting influence on the patient and to decrease the irritation of the eyes and throat normally produced by chlorine gas but insufficient to be objectionable from its physiological aspect as an anæsthetic.

2. In a method of administering chlorine gas for the treatment of colds and the like the improvement which comprises exposing to the atmosphere of a closed room wherein a patient is being treated a solution of chlorine in methylene chloride, the ratio of chlorine to methylene chloride being such as to give on evaporation an approximately constant concentration of chlorine gas during the period of treatment, the amount of chlorine present in said solution being sufficient to be effective in treating colds and the like but insufficient to be harmful to the patient, and the amount of chlorinated methane present being sufficient to have a quieting influence on the patient and to decrease the irritation of the eyes and throat normally produced by chlorine gas but insufficient to be objectionable from its physiological aspect as an anæsthetic.

3. In a method of administering chlorine gas for the treatment of colds and the like the improvement which comprises exposing to the atmosphere of a closed room wherein a patient is being treated a solution of chlorine in carbon tetrachloride, the ratio of chlorine to carbon tetrachloride being such as to give on evaporation an approximately constant concentration of chlorine gas during the period of treatment, the amount of chlorine present in said solution being sufficient to be effective in treating colds and the like but insufficient to be harmful to the patient, and the amount of carbon tetrachloride present being sufficient to have a quieting influence on the patient and to decrease the irritation of the eyes and throat normally produced by chlorine gas but insufficient to be objectionable from its physiological aspect as an anæsthetic.

In testimony whereof I affix my signature.

RALPH H. McKEE.